(12) United States Patent
Nishigaki

(10) Patent No.: US 7,748,852 B2
(45) Date of Patent: Jul. 6, 2010

(54) DIGITAL PLANETARIUM APPARATUS

(75) Inventor: Junji Nishigaki, Toyokawa (JP)

(73) Assignee: Konica Minolta Planetarium Co., Ltd., Osaka (JP)

( * ) Notice: Subject to any disclaimer, the term of this patent is extended or adjusted under 35 U.S.C. 154(b) by 835 days.

(21) Appl. No.: 11/649,681

(22) Filed: Jan. 4, 2007

(65) Prior Publication Data

US 2007/0159607 A1      Jul. 12, 2007

(30) Foreign Application Priority Data

Jan. 11, 2006      (JP)      ............................. 2006-003194

(51) Int. Cl.
*G03B 21/14*      (2006.01)

(52) U.S. Cl. ............................. 353/94; 353/30; 434/285

(58) Field of Classification Search ................... 353/30, 353/94, 79; 434/284, 285, 286
See application file for complete search history.

(56) References Cited

U.S. PATENT DOCUMENTS

| | | | | |
|---|---|---|---|---|
| 3,904,289 A | * | 9/1975 | Yager | 353/122 |
| 4,427,274 A | * | 1/1984 | Pund et al. | 353/99 |
| 5,071,209 A | * | 12/1991 | Chang et al. | 359/19 |
| 5,184,248 A | * | 2/1993 | de Vaan et al. | 359/483 |
| 5,457,508 A | * | 10/1995 | Ichihara et al. | 353/10 |
| 5,762,413 A | * | 6/1998 | Colucci et al. | 353/122 |
| 6,231,189 B1 | * | 5/2001 | Colucci et al. | 353/20 |
| 6,733,136 B2 | * | 5/2004 | Lantz et al. | 353/79 |
| 6,871,961 B2 | * | 3/2005 | Balu et al. | 353/94 |
| 6,880,939 B2 | * | 4/2005 | Colucci et al. | 353/122 |
| 6,905,218 B2 | * | 6/2005 | Courchesne | 353/122 |
| 7,621,647 B1 | * | 11/2009 | Colucci et al. | 353/121 |
| 2001/0033365 A1 | * | 10/2001 | Colucci et al. | 353/20 |
| 2002/0149752 A1 | * | 10/2002 | Courchesne | 353/122 |
| 2003/0117588 A1 | * | 6/2003 | Balu et al. | 353/30 |
| 2004/0145709 A1 | * | 7/2004 | Colucci et al. | 353/94 |
| 2007/0097331 A1 | * | 5/2007 | Sadler et al. | 353/79 |

FOREIGN PATENT DOCUMENTS

| | | |
|---|---|---|
| JP | 2004-361880 A | 12/2004 |
| JP | 2005-31270 A | 2/2005 |

* cited by examiner

*Primary Examiner*—William C Dowling
(74) *Attorney, Agent, or Firm*—Sidley Austin LLP

(57) ABSTRACT

A digital planetarium apparatus includes an original image generator, an intermediate image generator, and a fish-eye lens. The original image generator is formed of two video projectors and generates semicircular images in display devices inside the respective video projectors. The intermediate image generator optically focuses the two semicircular images generated by the original image generator to thereby generate a circular image. The fish-eye lens projects the circular image generated by the intermediate image generator.

12 Claims, 15 Drawing Sheets

DIGITAL PLANETARIUM APPARATUS

This application is based on Japanese Patent Application No. 2006-003194 filed on Jan. 11, 2006, the contents of which are hereby incorporated by reference.

BACKGROUND OF THE INVENTION

1. Field of the Invention

The present invention relates to a digital planetarium apparatus, for example a digital planetarium apparatus which projects a picture of a video projector onto a dome screen. Moreover, the invention relates to a dome picture apparatus which is applicable as a multipurpose image apparatus (for amusement or the like) and which projects a picture over a wide range of a dome screen.

2. Description of Related Art

Digital planetariums have been gradually wide spread in the world, and transition is occurring from the golden era of optical planetariums to the era of digital planetariums. With the digital planetarium, not only the starry sky observed on the earth and the condition observed in the universe but also the surface condition of a heavenly body observed from thereabove and the like can be reproduced. Moreover, for the digital planetarium, a video projector in a DLP® method, a D-ILA® method, or a liquid crystal method is generally adopted, and the one with an aspect ratio of 16 to 9, which has been conventionally 4 to 3, has been widespread following the trends toward higher vision.

Projection methods adopted for a digital planetarium are largely classified into a split projection method and a single lens projection method. A digital planetarium adopting the split projection method, by using a plurality of (for example, 6) video projectors arranged around a dome, projects images of display devices and links together the images to generate a picture covering the entire dome sky (for example, see patent documents 1 and 2). This permits playing an entire sky picture of the starry sky or the like with feeling of devotion and realistic sensation. On the other hand, a digital planetarium adopting the single lens projection method has one video projector at the center of a dome and magnifies a picture with a fish-eye lens fitted thereto to project the picture on the entire dome sky (for example, see patent document 1), and its use is starting to be widespread due to its excellent maintainability.

[Patent Document 1] JP-A-2004-361880

[Patent Document 2] JP-A-2005-31270

The digital planetarium adopting the split projection method, which forms a picture by using a plurality of video projectors, faces difficulty in brightness adjustment of each video projector. Moreover, if the brightness or the like is out of adjustment because of time-dependent change or the like, remarkable discontinuity appears in a picture on the dome, which is visually undesirable to the audience and which is also very difficulty to adjust. On the other hand, the digital planetarium apparatus adopting the single lens projection method faces no such problem, but has difficulty in achieving higher resolution due to its configuration that a picture covering the entire dome sky is projected with one fish-eye lens for one video projector. Further, an image region generated by the digital planetarium is circular shaped; thus, with a recent video projector having an image display surface with an aspect ratio of nearly 16 to 9, the image region is determined by pixels in the short side direction. As a result, a non-image region increases, thus causing a problem of poor projection efficiency.

SUMMARY OF THE INVENTION

In view of the circumstances described above, the present invention has been made, and it is an object of the invention to a digital planetarium apparatus and a dome picture apparatus capable of providing higher resolution and also increasing an image region generated by a video projector to effectively use an image display surface even when a single lens projection method is adopted.

In order to achieve the object described above, a digital planetarium apparatus includes: an original image generator which is formed of two video projectors and which generates semicircular images in display devices inside the respective video projectors; an intermediate image generator which optically focuses the two semicircular images generated by the original image generator to thereby generate a circular image; and a fish-eye lens which projects the circular image generated by the intermediate image generator.

According to another aspect of the invention, a digital planetarium apparatus includes: an original image generator which is formed of two video projectors and which generates semicircular images in display devices inside the respective video projectors; a fish-eye lens which is formed of, in order from an enlargement side, a front lens group and a rear lens group and which projects the two semicircular images generated by the original image generator; and an image synthesizer which synthesizes optical paths of the two semicircular images between the front lens group and the rear lens group so that the two semicircular images are so focused as to be linked together as one circular image.

According to still another aspect of the invention, a dome picture apparatus includes: an original image generator which is formed of two video projectors and which generates semicircular images in display devices inside the respective video projectors; an intermediate image generator which optically focuses the two semicircular images generated by the original image generator to thereby generate a circular image; and a fish-eye lens which project, on a dome screen, the circular image generated by the intermediate image generator.

According to still another aspect of the invention, a dome picture apparatus includes: an original image generator which is formed of two video projectors and which generates semicircular images in display devices inside the respective video projectors; a fish-eye lens which is formed of, in order from an enlargement side, a front lens group and a rear lens group and which projects on a dome screen the two semicircular images generated by the original image generator; and an image synthesizer which synthesizes optical paths of the two semicircular images between the front lens group and the rear lens group so that the two semicircular images are so focused as to be linked together as one circular image.

DETAILED DESCRIPTION OF PREFERRED EMBODIMENTS

Hereinafter, embodiments and the like of a digital planetarium apparatus according to the present invention will be described with reference to the accompanying drawings. Portions equal to or corresponding to one another among the embodiments and the like are provided with the same numerals and thus overlapping description will be omitted as appropriate.

Figure 1:
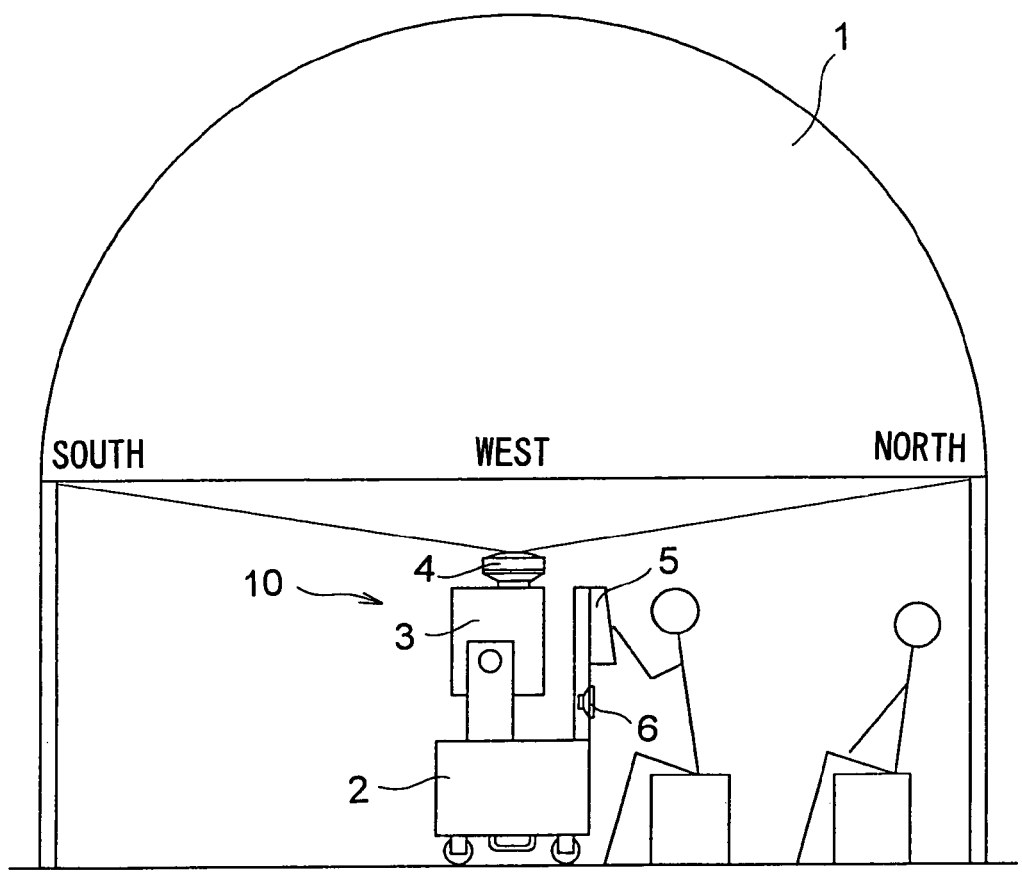
FIG. 1 is a schematic diagram showing an outline structure example of an entire digital planetarium according to the present invention.

FIG. 1 shows the schematic configuration of entire planetarium facility to which the apparatuses of the respective embodiments are applied. The digital planetarium is, as shown in FIG. 1, composed of a hemispherical dome screen 1 and a digital planetarium apparatus 10 installed at the lower center of the hemispherical dome screen 1. The digital planetarium apparatus 10 is provided with a reproduction part 2, a projection part 3, a fish-eye lens part 4, an operation part 5, a speaker 6, and the like. The reproduction part 2 performs reproduction and the like of a video picture projected on the dome screen 1, sounds broadcasted in the planetarium facility, and the like. The projection part 3, by using a signal from the reproduction part 2, forms a video picture, which is projected on the entire sky of the dome screen 1 by the fish-eye lens part 4. The operation part 5 is provided to permit the operator to set, through an operation panel 5a (FIG. 2), picture contents during or before demonstration; for example, the operator can select various functions through a plurality of buttons displayed on a touch panel. The selectable functions include: for example, so-called narration assistance function for constellation pictures, constellation lines, polar coordinate lines, and the like; and simulation function including unique movement of a fixed star, pseudo-space flight, and the like.

Figure 2:
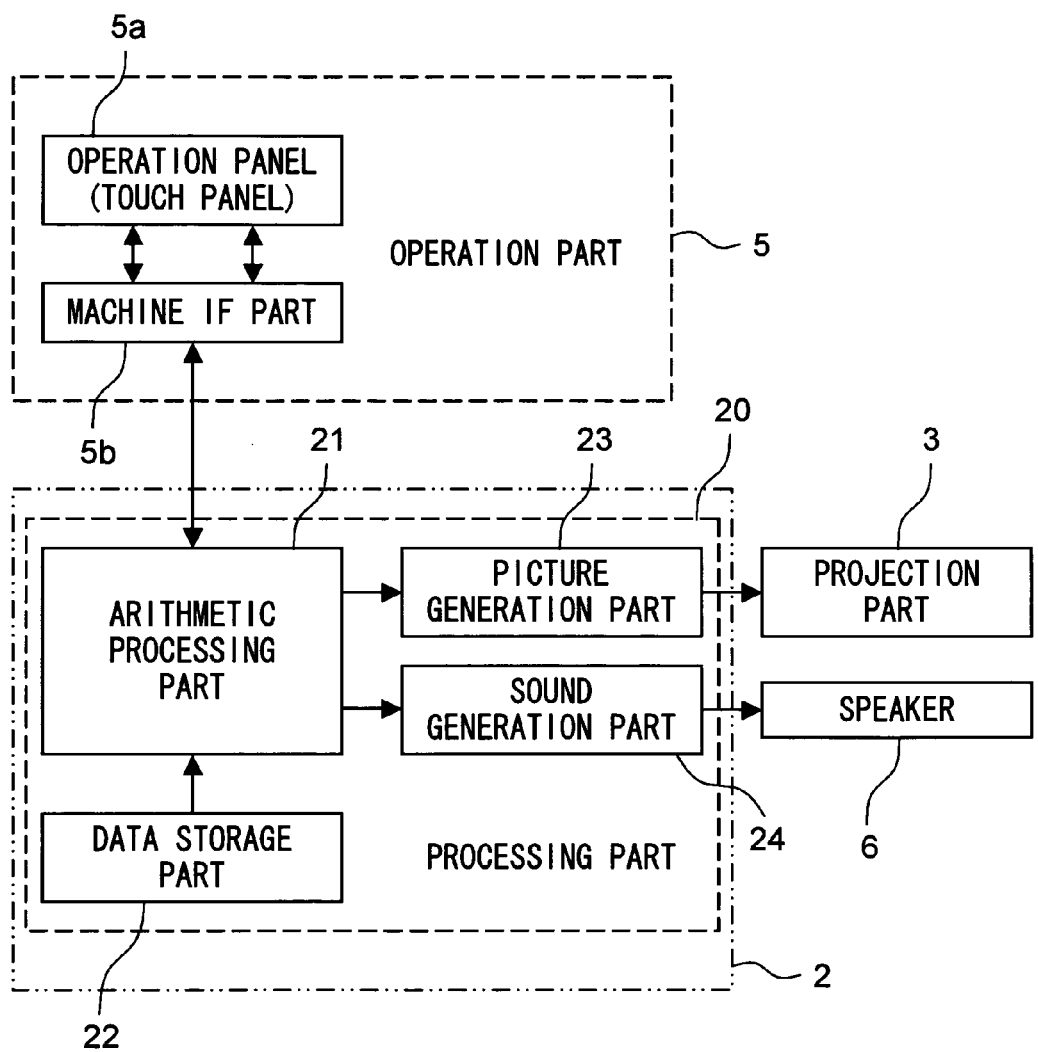
FIG. 2 is a block diagram showing an example of control configuration of the digital planetarium apparatus in FIG. 1.

FIG. 2 is a block diagram showing control configuration of the digital planetarium apparatus 10. The reproduction part 2 has therein a processing part 20 which has an arithmetic processing part 21, a data storage part 22, a picture generation part 23, and a sound generation part 24. The operation part 5 has the operation panel (touch panel) 5a and a machine IF part 5b for communication with the processing part 20. The arithmetic processing part 21 performs various arithmetic processing and also performs picture control, sound control, illumination control and the like based on commands from the operation part 5 and the like. The data storage part 22 stores data required for control and files required for projection and the like. The data to be stored includes: for example, the brightness and arrangement of a heavenly body; astronomical data such as the names and array of constellations, constellation regions; and the like. The files to be stored include: for example, files of photographic images of a heavenly body, files of constellation pictures, files of sounds (for example, automatic narration and BGM); and the like. The picture generation part 23 generates a picture to be projected on the dome screen 1. The generated picture is transmitted to the projection part 3 to be projected on the dome screen 1. The sound generation part 24 generates a sound broadcasted in the planetarium facility. The generated sound is broadcasted in the planetarium facility via the speaker 6.

The digital planetarium configured as described above plays a program in the following manner. First, when the operator in the dome operates the operation part 5 to select and execute a desired program, the program starts (note that a teleoperator part may be installed so that the operator outside the dome performs remote operation). More specifically, the arithmetic processing part 21 reads a sequence of this program from the data storage part 22, and based on this, performs various controls of the picture generation part 23 and the sound generation part 24. In this operation, the picture generation part 23 writes an image based on picture image data of the program onto a projection screen of the projection part 3. As a result, this image is projected on the dome screen 1 via the fish-eye lens part 4. In addition, depending on operation, it is also of course possible to provide automatic narration for the starry sky and to stop the program in the course of this program.

Next, the digital planetarium apparatus 10 preferably applicable for use in the digital planetarium of FIG. 1 will be described, referring to three types of embodiments with distinctive optical constructions. The first and second type digital planetarium apparatuses 10 are configured to have: an original image generator which is composed of two video projectors provided with display devices generating semicircular images; an intermediate image generator which optically focuses the two semicircular images formed by the original image generator to thereby generate a circular image; and a fish-eye lens which projects the circular image generated by the intermediate image generator. Of these types, with the first type, focusing by the intermediate image generator is performed for semicircular images which are offset to one side of the optical axis, and with the second type, focusing by the intermediate image generator is performed for semicircular images which are set with respect to the optical axis serving as a center. The third type digital planetarium apparatus 10 is configured to have: an original image generator which is composed of two video projectors provided with display devices generating semicircular images; a fish-eye lens which is formed of, in order from the enlargement side, a front lens group and rear lens groups and which projects the two semicircular images generated by the original image generator; and an image synthesizer which synthesizes optical paths of the two semicircular images between the front lens group and the rear lens groups so that the two semicircular images are so focused as to be linked together as one circular image. Hereinafter, the optical construction of each of the types will be described in more detail (for easier understanding of association between the two semicircular images and one circular image, their generation conditions will be schematically shown in the figure when necessary).

Figure 3:
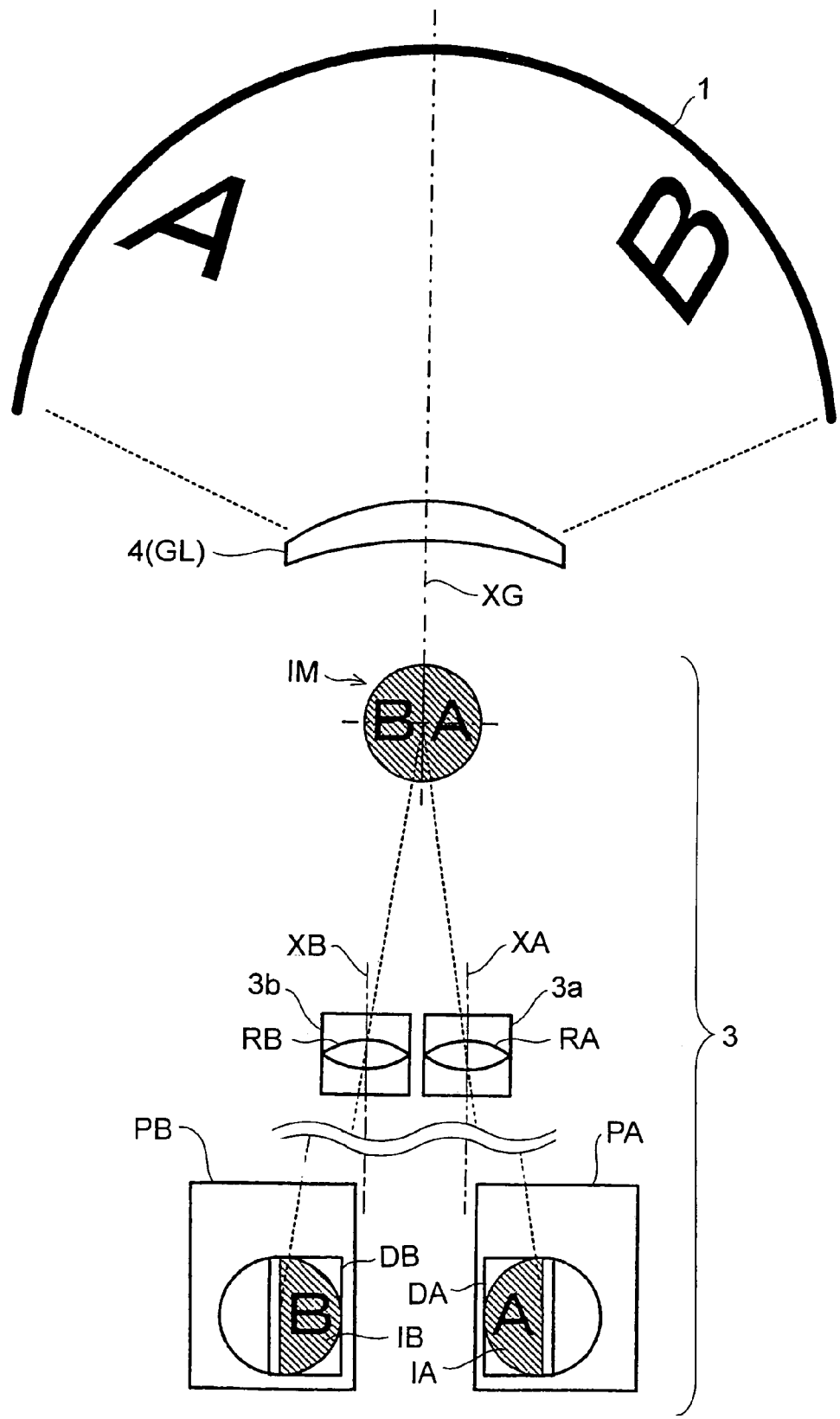
FIG. 3 is a diagram showing outline optical construction of a first type digital planetarium apparatus.

The first type digital planetarium apparatus 10, as shown in FIG. 3, is configured to have two video projectors PA and PB and two relay lens sections 3a and 3b in the projection part 3 and project, by the fish-eye lens part 4 arranged on the light emission side thereof, a picture on the dome screen 1. The two video projectors PA and PB corresponding to the original image generator have therein display devices DA and DB, respectively, in which semicircular images IA and IB are respectively generated. As the display devices DA and DB, digital micromirror devices, reflection type or transmission type LCDs (liquid crystal displays) or the like are used.

When the digital micromirror devices are used as the display devices DA and DB, light entering therein is spatially modulated by being reflected by the respective micromirrors in ON/OFF state (for example, in a state inclined through ±12 degrees). In this condition, only the light reflected on the micromirrors in the ON state enters the relay lens sections 3a and 3b, whereby display images of the display devices DA and DB are projected onto the dome screen 1 on an enlarged scale. Moreover, as the display devices DA and DB, selfluminous display devices such as EL elements (electro luminescence elements) or the like may be used. The use of the selfluminous display devices as the display devices no longer requires a illumination light source and the like, thus permitting achieving further weight saving and downsizing of the entire apparatus.

Figure 4:
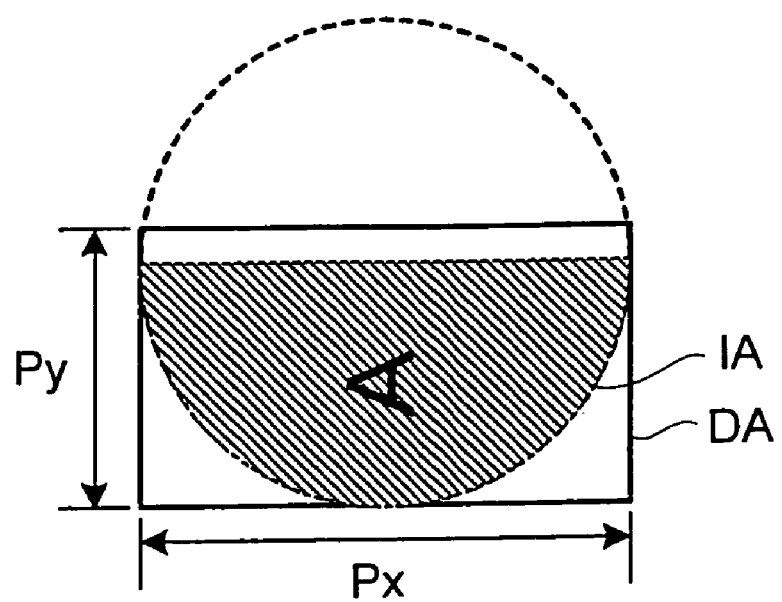
FIG. 4 is a diagram showing an original plate image of one of video projectors in FIG. 3.

FIG. 4 shows an original plate image of the video projector PA. The image display surface of the display device DA generating the semicircular image IA is formed into a rectangular shape with an aspect ratio of 16 to 9 (equal to 1920 to 1080) where Px is 1920 pixels and Py is 1080 pixels. When a circular image is generated on the image display surface with an aspect ratio of 16 to 9, the image region is determined by the pixel count Py in the short side direction. As a result, the resolution is limited to the pixel count Py in the short side direction, and also a non-image region increases resulting in deteriorated projection efficiency. On the contrary, with configuration such that the semicircular image IA is generated on the display device DA as shown in FIG. 4, even when the image display surface has an aspect ratio of 16 to 9, by matching the diameter direction of the semicircular image IA with the long side direction of the image display surface, the resolution can be improved to the pixel count Px in the long side direction and the projection efficiency is improved due to a decrease in a non-projection region as a result of a decrease in a non-image region. Therefore, from a viewpoint of dividing one circular image into two semicircular images to form a half projected image into the shape closer to the shape of the image display surface of the display device, an aspect ratio of nearly 2 to 1 is preferable; thus, for example, 16 to 9 is more advantageous than 4 to 3.

As shown in FIG. 3, the two relay lens sections 3a and 3b corresponding to the intermediate image generator have therein relay lenses RA and RB, respectively. The two semicircular images IA and IB generated on the video projectors PA and PB are focused by the relay lenses RA and RB, respectively, to form one circular image IM of the two semicircular images IA and IB. The circular image IM may be an aerial image or an image focused on a screen, not shown. Moreover, a field lens (FIG. 5) may be arranged at the focusing position or in the vicinity thereof to match the ray angles of the relay lenses RA and RB with the ray angle of the fish-eye lens GL. In either case, the circular image IM as an intermediate image is projected onto the dome screen 1 on an enlarged scale by the fish-eye lens GL (XG: optical axis) built in the fish-eye lens part 4. The relay lenses RA and RB and the fish-eye lens GL are not limited to an optical system formed of only lenses provided as transmission type optical elements, but may be an optical system including reflection type optical elements, such as a mirror or the like, an optical system including diffraction type optical elements, such as a diffractive lens or the like, or the like.

The first type digital planetarium apparatus 10 is characterized in that focusing by the relay lenses RA and RB is performed for the semicircular images IA and IB offset to the one side of the optical axes XA and XB. That is, the first type digital planetarium apparatus 10 is characterized in that the optical axes XA and XB of the relay lenses RA and RB are shifted from the center of the display devices DA and DB. Since the display devices DA and DB are offset with respect to the relay lenses RA and RB, focusing by using a portion biased to one side of the optical axes XA and XB is performed on the relay lenses RA and RB. This configuration improves the degree of freedom in designing and arrangement of the relay lenses RA and RB, thus permitting downsizing of the projection part 3 and the planetarium apparatus 10 having the projection part 3 built therein.

Figure 5:
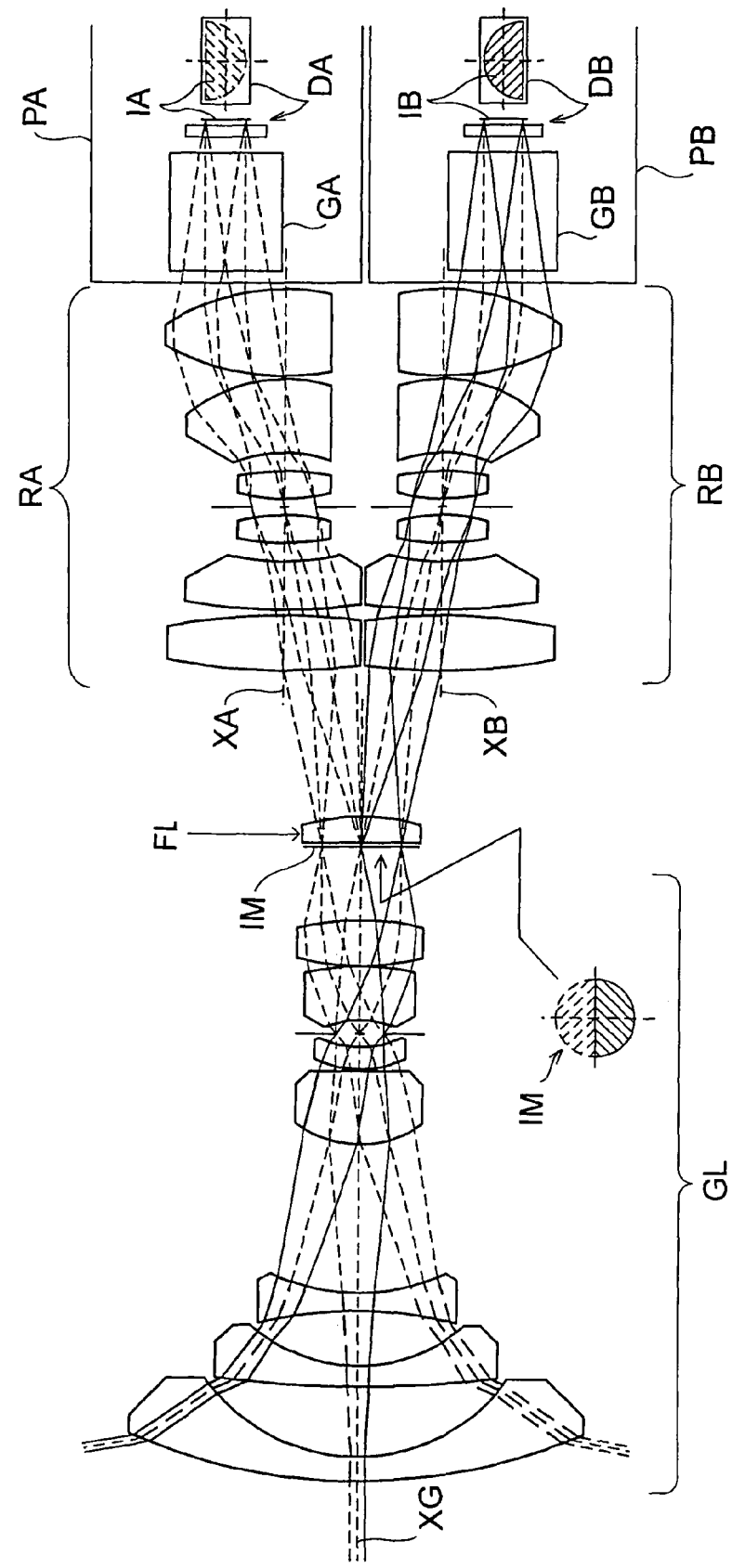
FIG. 5 is an optical construction diagram of a first embodiment.
Figure 6:
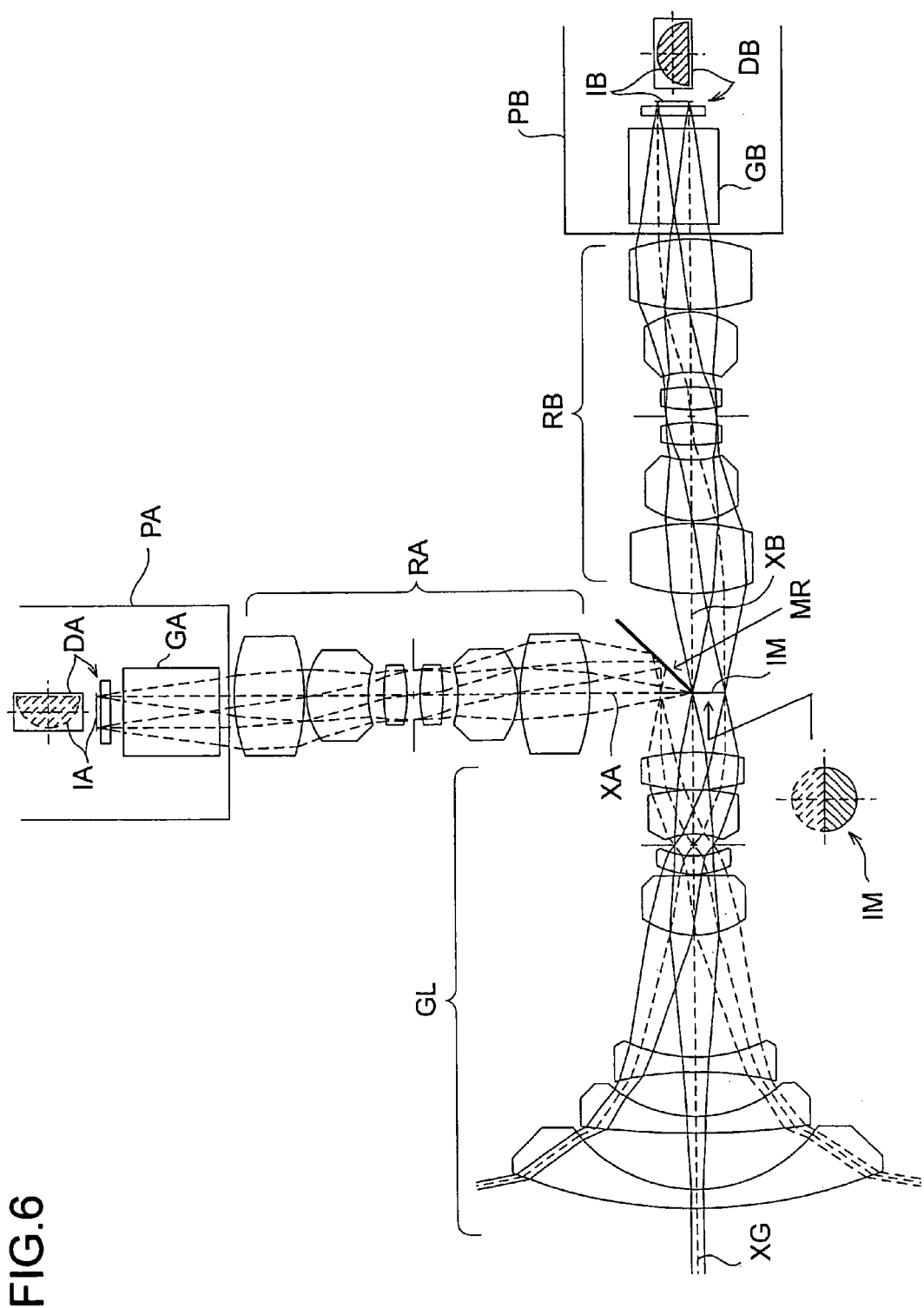
FIG. 6 is an optical construction diagram of a second embodiment.
Figure 7:
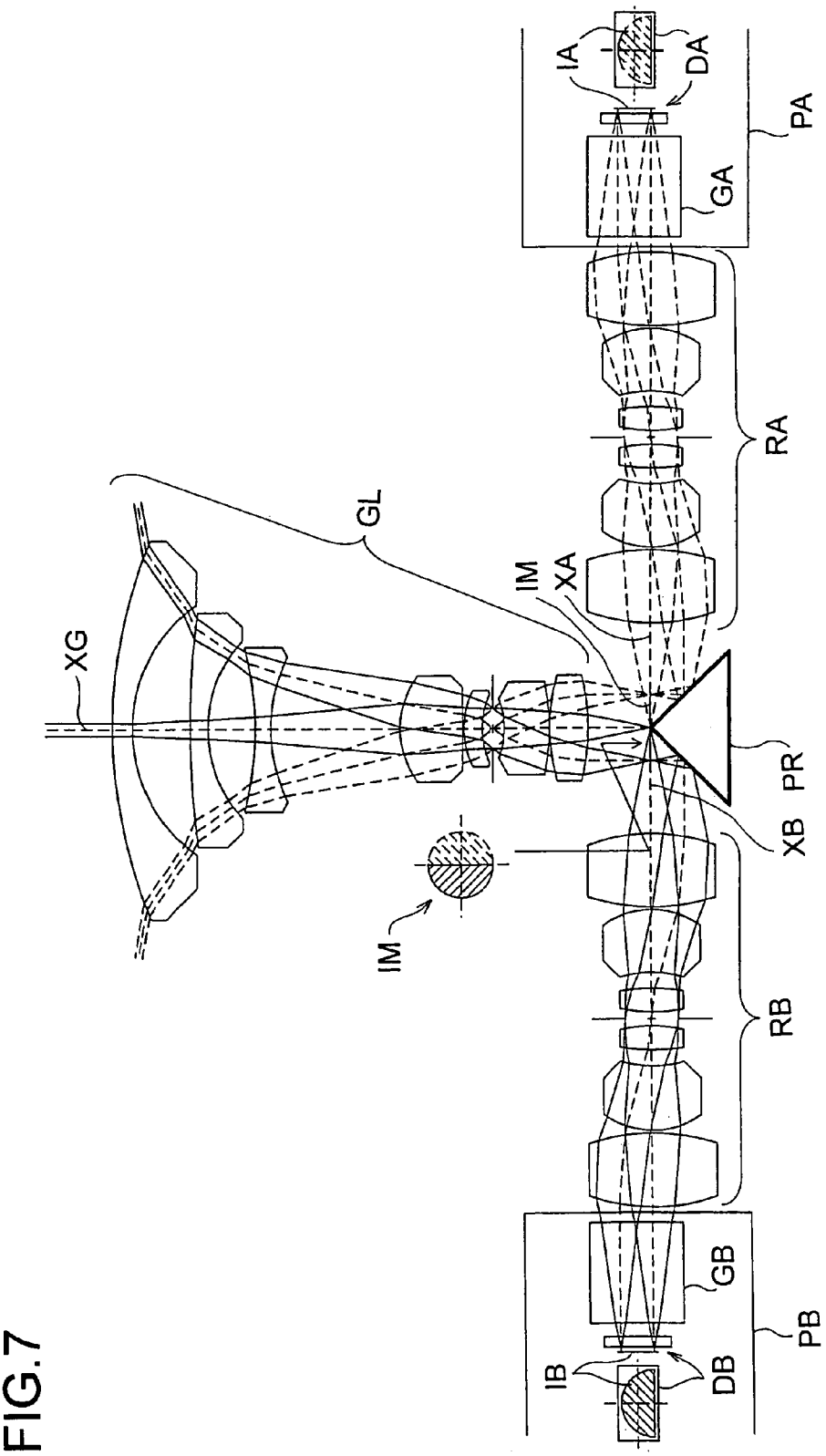
FIG. 7 is an optical construction diagram of a third embodiment.

The optical construction of the first type digital planetarium apparatus 10 will be described in more detail, referring to the first to third embodiments. FIGS. 5 to 7 show the optical constructions of the first to third embodiments, respectively. The video projectors PA and PB used in the first to third embodiments have prisms GA and GB built therein. Here, as the prisms GA and GB, TIR (Total Internal Reflection) prisms are assumed which reflect illumination light and transmit projected light. However, the prisms GA and GB to be used are not limited to these, and thus one PBS (polarization beam splitter) prism or one three-plate type prism (prism for color separation and color composition or the like) suitable for a projection system and a display device, or those in combination may be used. Moreover, for a single-plate type video projector not using a prism, the prisms GA and GB may be omitted.

Figure 13:
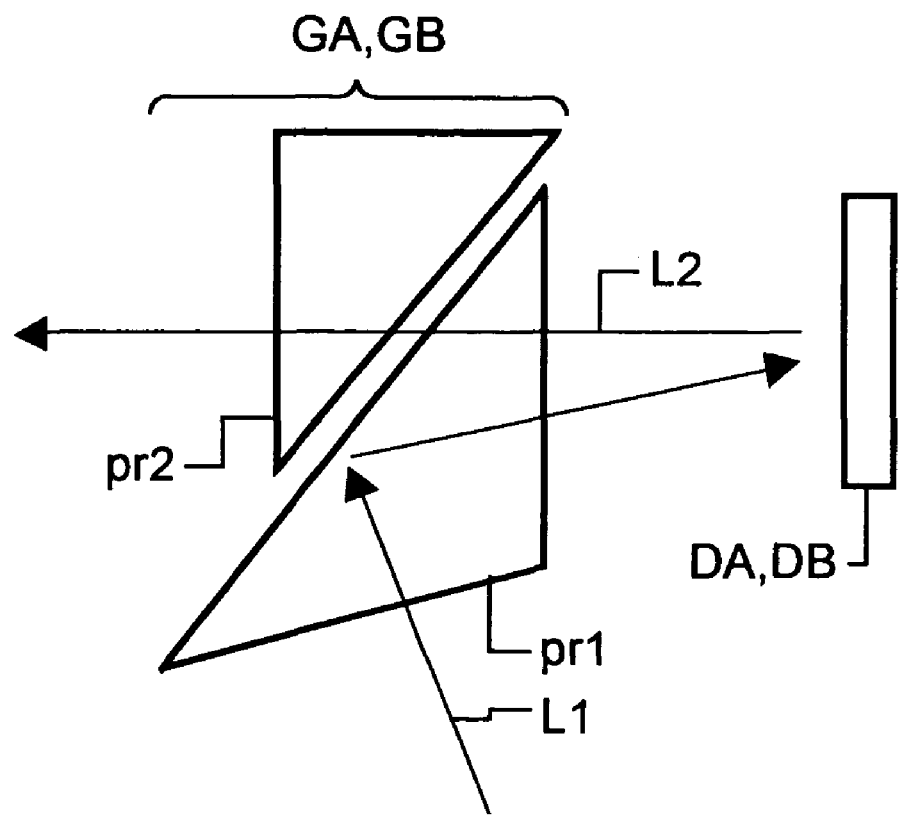
FIG. 13 is a diagram showing a construction example of a single-plate type system of a TIR prism.

FIG. 13 shows a construction example of a single plate type system of a TIR prism which separates illumination light and projected light from each other by using a difference in the angle of incidence around the critical angle. The TIR prism is formed of prisms pr1 and pr2 with an air gap provided therebetween. Illumination light L1 entering the prism pr1 is totally reflected by entering the prism surface facing the air gap between the prisms pr1 and pr2 at an angle of over the critical angle. Thereafter, the illumination light L1 exits from the prism pr1, and is reflected by the display devices DA and DB (for example, digital micromirror devices) to thereby enter again the prism pr1 as projected light. The projected light L2 entering the prism pr1 is transmitted through the prism pr1, the air gap, and the prism pr2 in this order by entering the prism surface facing the air gap between the prisms pr1 and pr2 at an angle of less than the critical angle.

In the first embodiment (FIG. 5), the fish-eye lens GL is substantially telecentric to the circular image IM side, and the relay lenses RA and RB are substantially telecentric to the display devices DA and DB side. Moreover, the optical axes XA and XB of the relay lenses RA and RB are shifted from the centers of the display devices DA and DB and also further shifted from the optical axis XG of the fish-lens GL. Even if the optical axes XA and XB of the relay lenses RA and RB and the optical axis XG of the fish-eye lens GL are offset from each other, ray angles of the relay lenses RA and RB and the ray angle of the fish-eye lens GL can be matched with one another by taking in light beams with a field lens FL having a positive optical power and arranged near the circular image IM to thereby efficiently direct light from the relay lenses RA and RB to the fish-eye lens GL. Further, since the fish-eye lens GL is substantially telecentric to the circular image IM side, the images can be linked together clearly, thus improving the brightness efficiency.

In the second embodiment (FIG. 6), while the optical axes XA and XB of the relay lenses RA and RB and the optical axis XG of the fish-eye lens GL are kept matched with one another, the optical paths located to the relay lens RA side of the circular image IM are bent by a mirror MR to thereby synthesize the optical paths so that the optical axes XA and XB of the relay lenses RA and RB become substantially orthogonal to each other. To link together the images clearly, it is preferable to set the edge shape of the mirror MR at a narrow angle, or the thinned mirror MR may be installed.

In the third embodiment (FIG. 7), while the optical axes XA and XB of the relay lenses RA and RB and the optical axis XG of the fish-eye lens GL are kept matched with one another, the optical paths located to the relay lenses RA and RB sides of the circular image IM are bent by a prism PR to thereby synthesize the optical paths so that the optical axes XA and XB of the relay lenses RA and RB substantially match with each other. As in the third embodiment, when the vertex angle of the prism PR is matched with the circular image IM, if this vertex angle is not formed into a complete edge (for example, if the prism vertex angle is not complete with defect or the like), corresponding shadow may be possibly formed at the center of the projected image surface corresponding to the joint between the semicircular images IA and IB. To resolve the adverse effect of this vertex angle, it is preferable that the prism PR be only slightly shifted to the fish-eye lens GL side so that the vertex angle of the prism PR is located closer to the fish-eye lens GL than the circular image IM. It is further preferable that part or the entire portion from the prism PR to the video projectors PA and PB be only slightly shifted to the fish-eye lens GL side.

Figure 14:
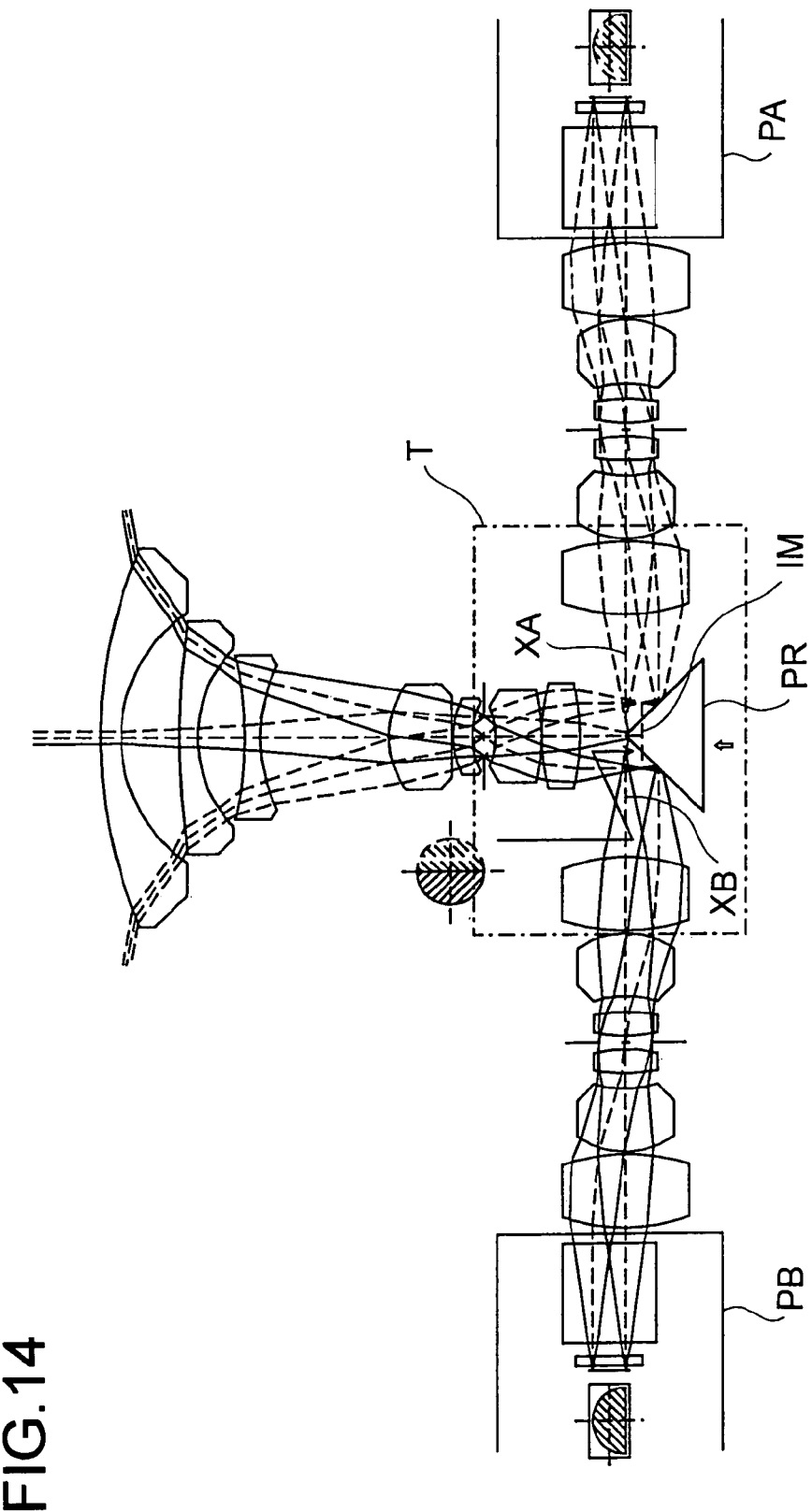
FIG. 14 is an optical construction diagram showing change in an optical path when the prism to the video projectors are slightly shifted to the fish-eye lens side in the third embodiment.
Figure 15:
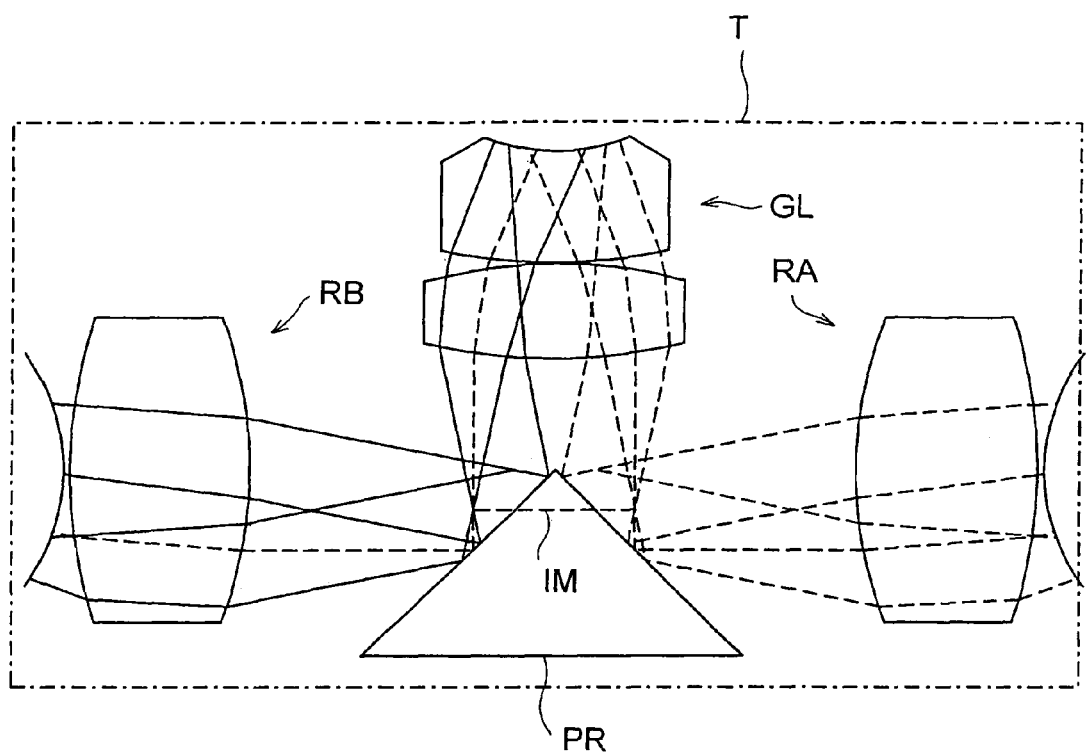
FIG. 15 is an enlarged view of a T area in FIG. 14.

FIG. 14 shows change in the optical paths when the portion from the prism PR to the video projectors PA and PB is only slightly shifted to the fish-eye lens GL side. FIG. 15 shows an optical path synthesis part T of FIG. 14 on an enlarged scale. The optical axes XA and XB to be folded to the relay lenses RA and RB sides are also offset by the amount of movement of the prism reflection surface. As a result, the shadow formed as the defect (that is, an image of the vertex angle) disappears by the defocused amount.

In the second and third embodiments (FIGS. 6 and 7), the fish-eye lens GL is substantially telecentric to the circular image IM side, and the relay lenses RA and RB are substantially telecentric to the both sides. Moreover, the optical axes XA and XB of the relay lenses RA and RB are shifted from the centers of the display devices DA and DB, and the optical axes XA and XB of the relay lenses RA and RB and the optical axis XG of the fish-eye lens GL match with each other. Matching the optical axes XA and XB of the relay lenses RA and RB with the optical axis XG of the fish-eye lens GL and also using the display devices DA and DB in an offset state in this manner permits design such that distortion, chromatic aberration of magnification, and curvature of field are interpolated between the relay lenses RA and RB and the fish-eye lens GL, thereby providing advantage that higher image quality can be achieved. Even when the fish-eye lens GL is not telecentric to the circular image IM side, the ray angles on the circular image IM side of the relay lenses RA and RB may be, by canceling out their telecentric state, matched with the ray angle of the fish-eye lens GL.

Figure 8:
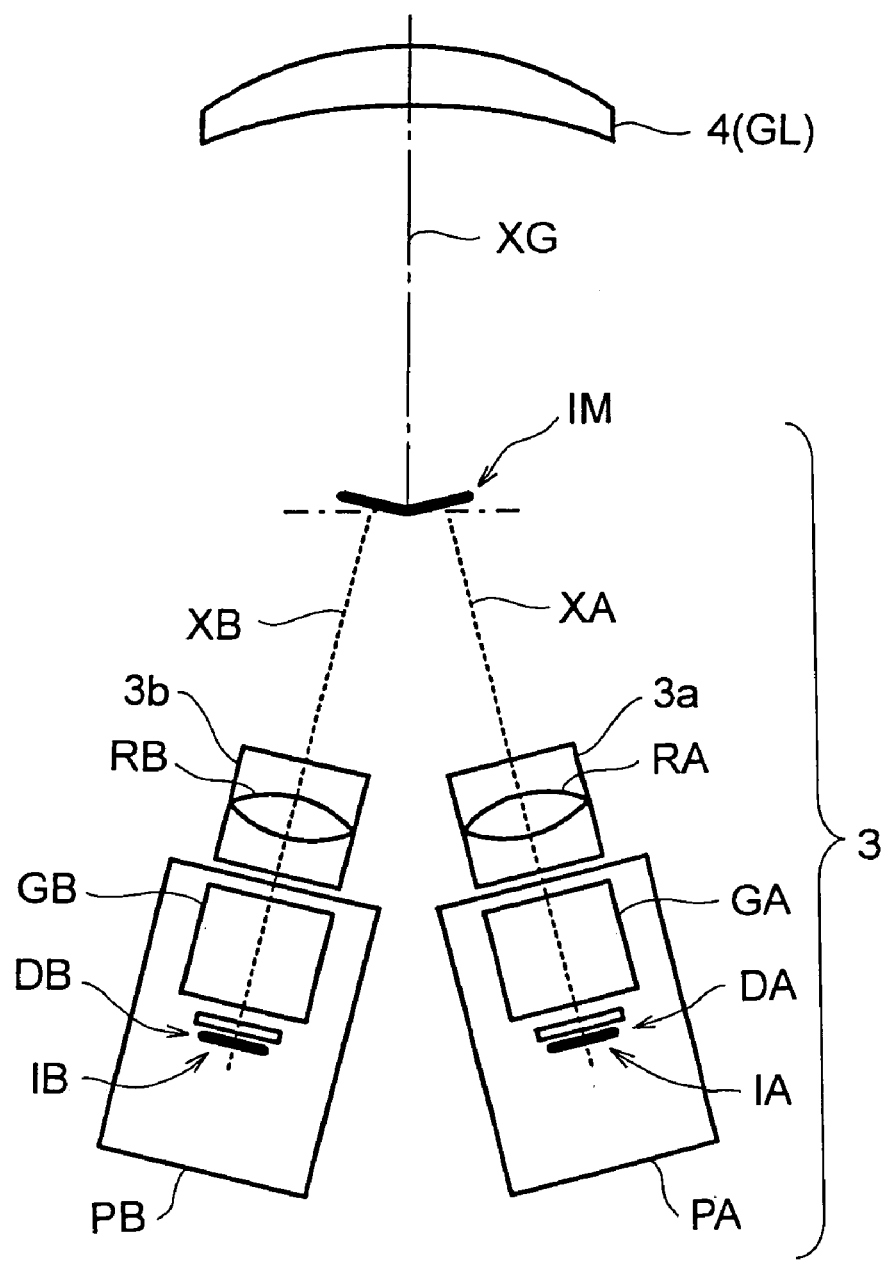
FIG. 8 is a diagram showing schematic optical construction of a second type digital planetarium apparatus.

The second type digital planetarium apparatus 10, as shown in FIG. 8, is configured to have two video projectors PA and PB and two relay lens sections 3a and 3b in a projection part 3 and project, by a fish-eye lens part 4 arranged on the light emission side thereof, a picture on the dome screen 1. As is the case with the first type (FIGS. 3 and 4), the two video projectors PA and PB corresponding to the original image generator have therein display devices DA and DB (digital micromirror devices, reflection type or transmission type LCDs, or the like), respectively, in which semicircular images IA and IB are respectively generated.

As shown in FIG. 8, the two relay lens sections 3a and 3b corresponding to the intermediate image generator have therein relay lenses RA and RB, respectively. The two semicircular images IA and IB generated by the video projectors PA and PB are focused on the relay lenses RA and RB, respectively, to form one circular image IM of the two semicircular images IA and IB. The circular image IM may be an aerial image or an image focused on a screen, not shown. Moreover, the two semicircular images IA and IB form the circular image IM of a dogleg shape, and a field lens (FIG. 10) may be arranged at the focusing position or in the vicinity thereof to match the ray angles of the relay lenses RA and RB with the ray angle of the fish-eye lens GL. In either case, the circular image IM as an intermediate image is projected onto the dome screen 1 (FIG. 1) on an enlarged scale by the fish-eye lens GL (XG: optical axis) built in the fish-eye lens part 4. The relay lenses RA and RB and the fish-eye lens GL are not limited to an optical system formed of only lenses provided as transmission type optical elements, but may be an optical system including reflection type optical elements, such as a mirror or the like, an optical system including diffraction type optical elements, such as a diffractive lens or the like, or the like.

The second type digital planetarium apparatus 10 is characterized in that focusing by the relay lenses RA and RB is performed for the semicircular images IA and IB set with respect to the optical axes XA and XB serving as a center. That is, the second type digital planetarium apparatus 10 is characterized in that the optical axes XA and XB of the relay lenses RA and RB match with the centers of the display devices DA and DB. Due to simple configuration such that the optical axes XA and XB of the relay lenses RA and RB pass through the centers of the display devices DA and DB, the circular image IM of the two semicircular images IA and IB is formed small accordingly, thus permitting low-cost design.

Figure 9:
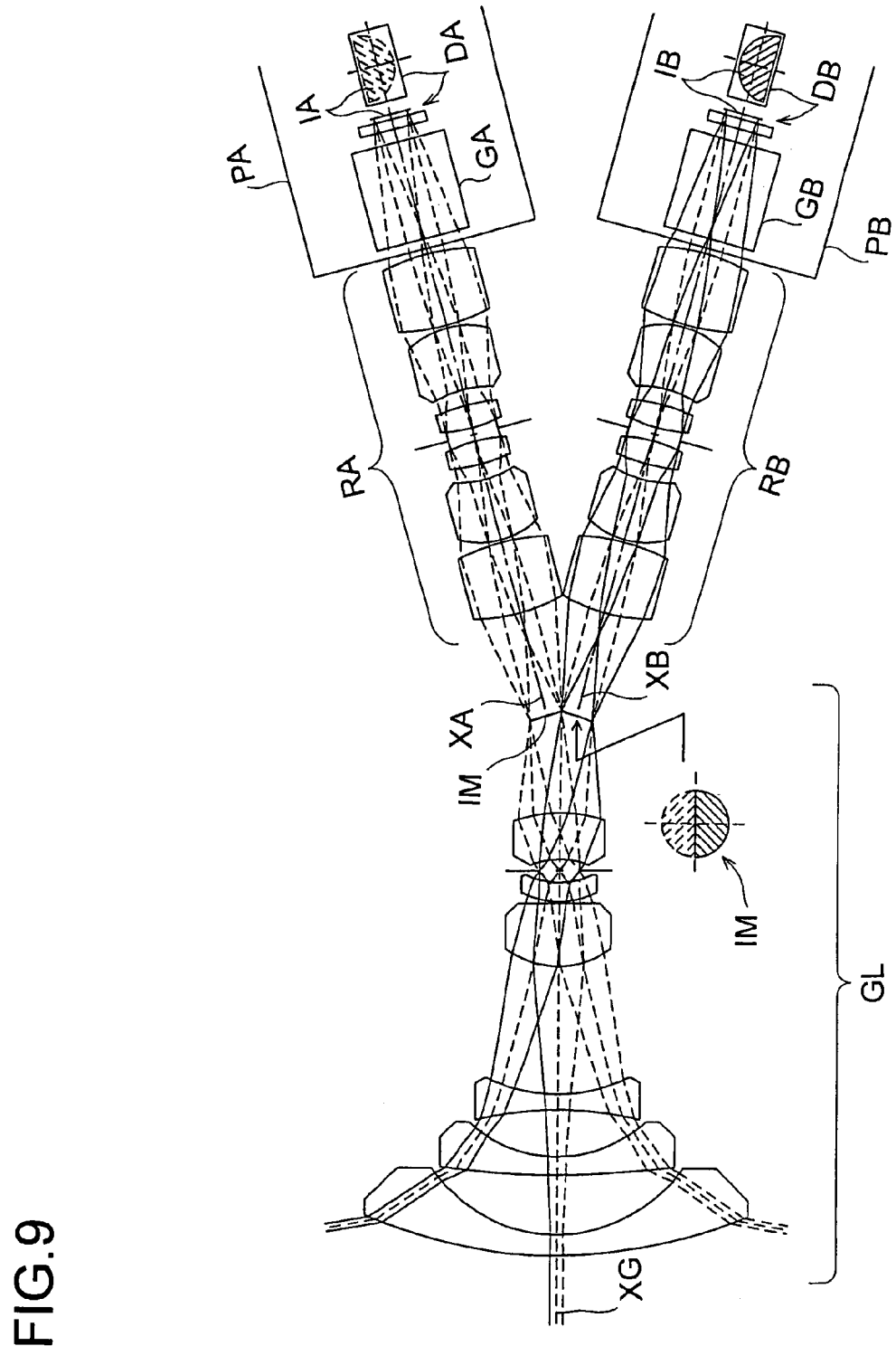
FIG. 9 is an optical construction diagram of a fourth embodiment.
Figure 10:
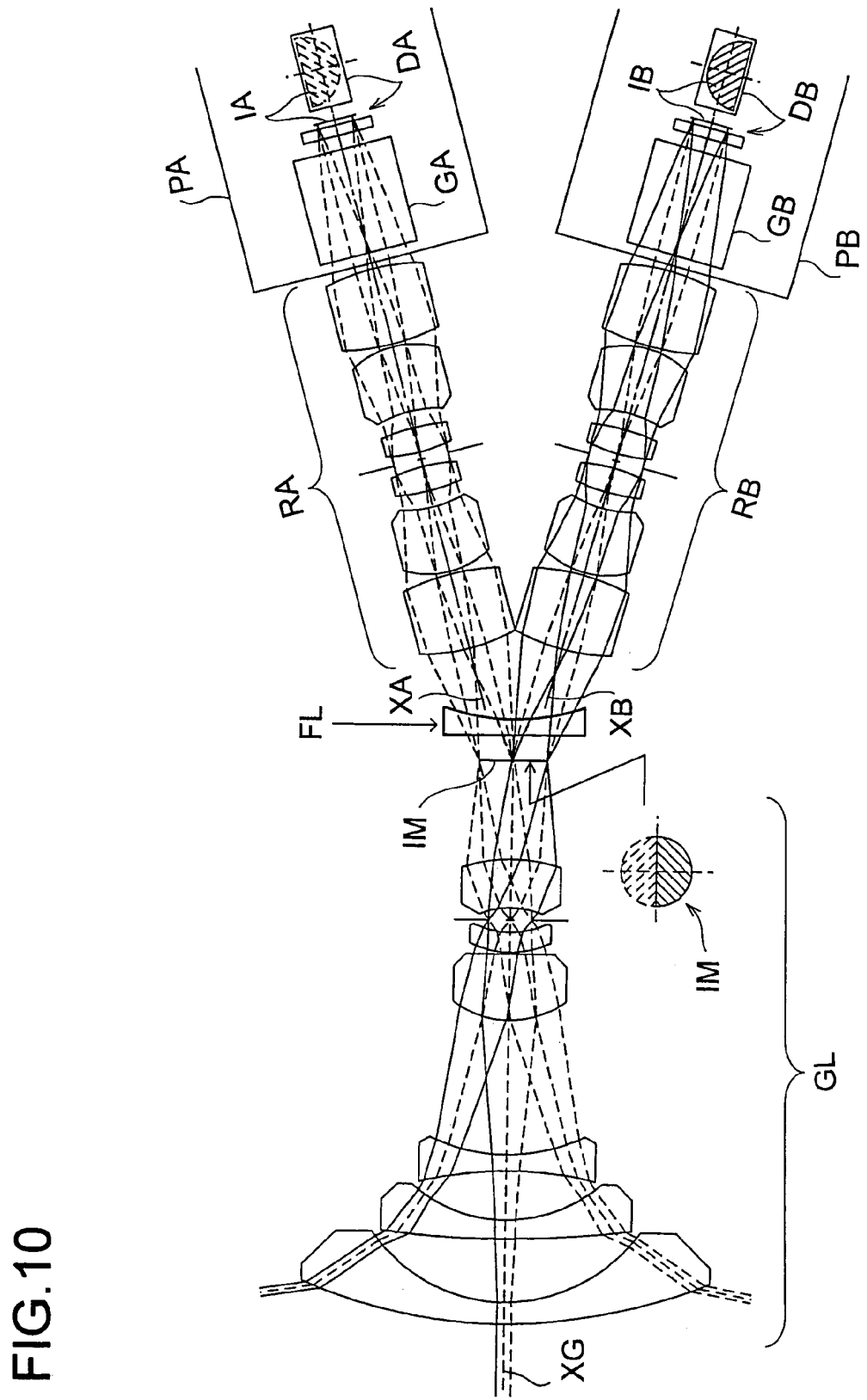
FIG. 10 is an optical construction diagram of a fifth embodiment.
Figure 11:
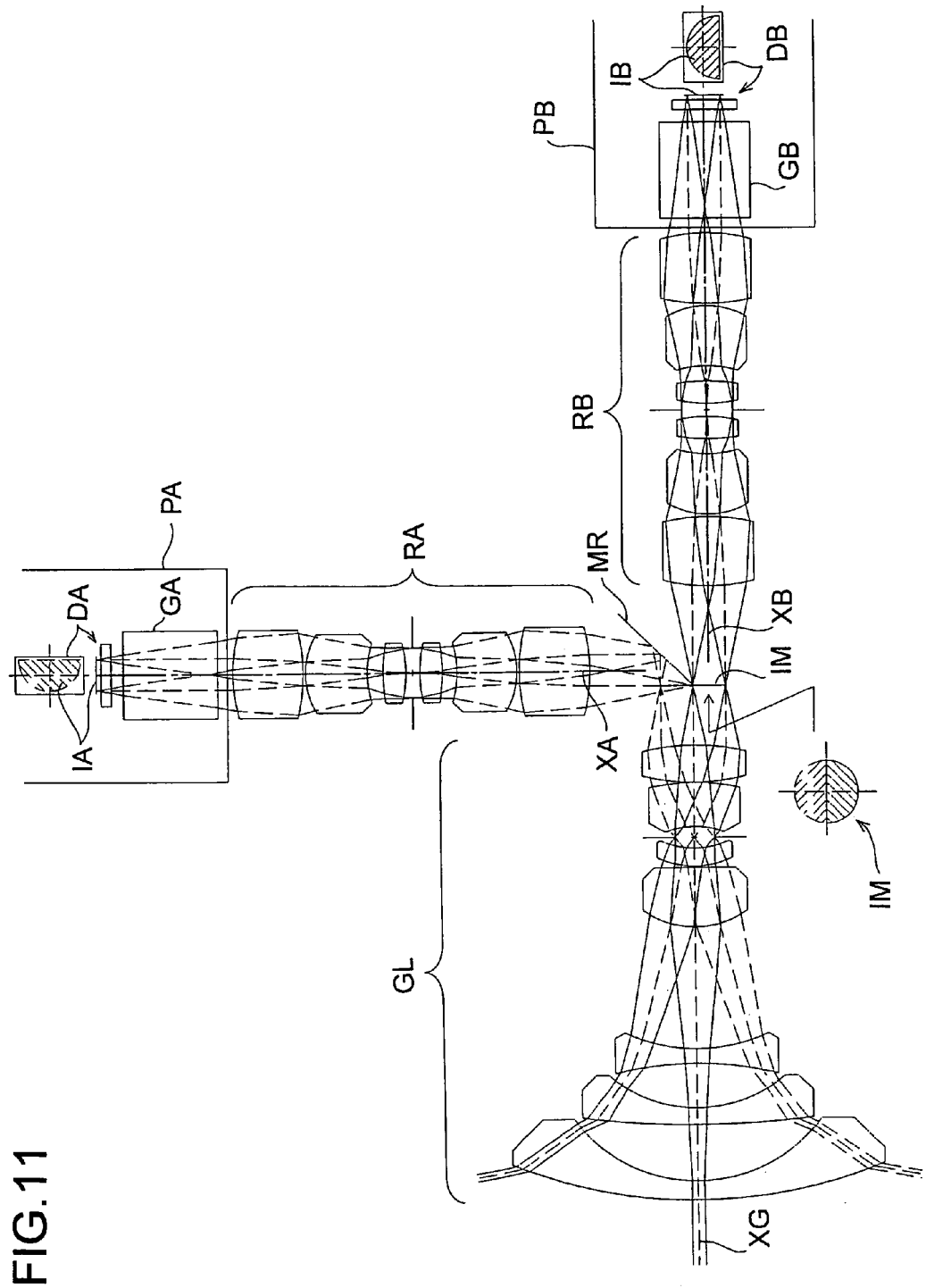
FIG. 11 is an optical construction diagram of a sixth embodiment.

The optical construction of the second type digital planetarium apparatus 10 will be described in more detail, referring to the fourth to sixth embodiments. FIGS. 9 to 11 show the optical constructions of the fourth to sixth embodiments, respectively. The video projectors PA and PB used in the fourth to sixth embodiments, as is the case with the first type (FIGS. 5 to 7), have prisms GA and GB built therein. Here, as the prisms GA and GB, TIR prisms (FIG. 13) are assumed which reflect illumination light and transmit projected light. However, the prisms GA and GB to be used are not limited to this type, and thus one PBS (polarization beam splitter) prism or one three-plate type prism (prism for color separation and color composition or the like) suitable for a projection system and a display device or those in combination may be used. Moreover, for a single-plate type video projector not using a prism, the prisms GA and GB may be omitted.

In the fourth embodiment (FIG. 9), the fish-eye lens GL is nontelecentric to the circular image IM side, and the optical axes XA and XB of the relay lenses RA and RB are shifted from the optical axis XG of the fish-eye lens GL, but the optical axes XA and XB of the relay lenses RA and RB are set at the centers of the display devices DA and DB (that is, the optical axes XA and XB of the relay lenses RA and RB match with the centers of the display devices DA and DB). Thus, the two semicircular images IA and IB form the circular image IM of a dogleg shape, and thus this simple construction permits low-cost design with. Moreover, the optical axes XA and XB of the relay lenses RA and RB and the normal line of the image display surface of the display devices DA and DB may be located not in parallel to each other so that the semicircular images IA and IB are focused perpendicularly to the optical axis XG of the fish-eye lens GL. That is, tilting the display devices DA and DB with respect to the optical axes XA and XB from their perpendicular condition to focus the semicircular images IA and IB perpendicularly to the optical axis XG of the fish-eye lens GL permits improving the circular image IM from a dogleg shape to a planar shape. The formation of the circular image IM into a planar shape permits an improvement in the image quality.

In the fifth embodiment (FIG. 10), the fish-eye lens GL is substantially telecentric to the circular image IM side, and the optical axes XA and XB of the relay lenses RA and RB are shifted from the optical axis XG of the fish-eye lens GL, but the optical axes XA and XB of the relay lenses RA and RB are set at the centers of the display devices DA and DB. Even if the optical axes XA and XB of the relay lenses RA and RB are shifted from the optical axis XG of the fish-eye lens GL, taking in light beams with a field lens FL of an optical negative power arranged near the circular image IM permits matching the ray angles of the relay lenses RA and RB with the ray angle of the fish-eye lens GL, thus efficiently directing light from the relay lens RA and RB to the fish-eye lens GL. Further, since the fish-eye lens GL is substantially telecentric to the circular image IM side, the images can be linked together clearly, improving the brightness efficiency.

In the sixth embodiment (FIG. 11), while the optical axes XA and XB of the relay lenses RA and RB and the optical axis XG of the fish-eye lens GL are kept matched with each other, the optical paths located to the relay lens RA side of the circular image IM are bent by the mirror MR to thereby synthesize the optical paths so that the optical axes XA and XB of the relay lenses RA and RB become substantially orthogonal to each other. To link together the images clearly, it is preferable to set the edge shape of the mirror MR at a narrow angle, or the thinned mirror MR may be installed. The fish-eye lens GL is substantially telecentric to the circular image IM side, and the relay lenses RA and RB are substantially telecentric to the both sides. Moreover, the optical axes XA and XB of the relay lenses RA and RB are set at the centers of the display devices DA and DB, and the optical axes XA and XB of the relay lenses RA and RB and the optical axis XG of the fish-eye lens GL match with each other. In the fourth embodiment, the two semicircular images IA and IB form the circular image IM of a dogleg shape, while in the sixth embodiment, the focusing position of one of the semicircular images, i.e., IA, is adjusted by the mirror MR so as to form a circular image IM of a flat shape. Thus, it is desirable that the fish-eye lens GL and the relay lenses RA and RB be also substantially telecentric to the circular image IM side. Even when the fish-eye lens GL is not telecentric to the circular image IM side, the ray angles on the circular image IM side of the relay lenses RA and RB may be, by canceling out their telecentric state, matched with the ray angle of the fish-eye lens GL.

As in the fourth to sixth embodiments, the optical constructions of the second type are simple such that the optical axes XA and XB of the relay lenses RA and RB match with the centers of the display devices DA and DB, thus achieving low price. However, for efficiency in taking in light beams (that is, measures against uneven brightness), it is lowest in the fourth embodiment, and improves in order of the fifth and sixth embodiments.

As described above, the first and second type digital planetarium apparatuses 10 are characterized by having: the original image generator which is formed of the two video projectors and which generates the semicircular images IA and IB in the display devices DA and DB inside the respective video projectors; the intermediate image generator which optically focuses the two semicircular images IA and IB generated by the original image generator to thereby generate the circular image IM; and the fish-eye lens GL which projects the circular image generated by the intermediate image generator. With such construction, in the original image generator, the semicircular images IA and IB are generated in the two video projectors (PA, PB) with an aspect ratio of, for example, 16 to 9, and then optically focused by the intermediate image generator to be synthesized as the circular image IM. The circular image IM is converted into a picture suitable for the dome whole sky and then projected onto the dome screen 1 (FIG. 1) by, for example, a fish-eye lens GL adopting a projection formula such as equidistance projection or the like. The construction, which uses the two video projectors PA and PB, permits achieving higher resolution, and since the semicircular images IA and IB are respectively formed on the display devices DA and DB, even if the video projectors PA and PB to be used have an aspect ratio of 16 to 9, a non-projected region decreases. Moreover, with reference to the brightness of one of the video projectors, the brightness of the other video projector can be adjusted, thus permitting easy brightness adjustment.

Figure 12:
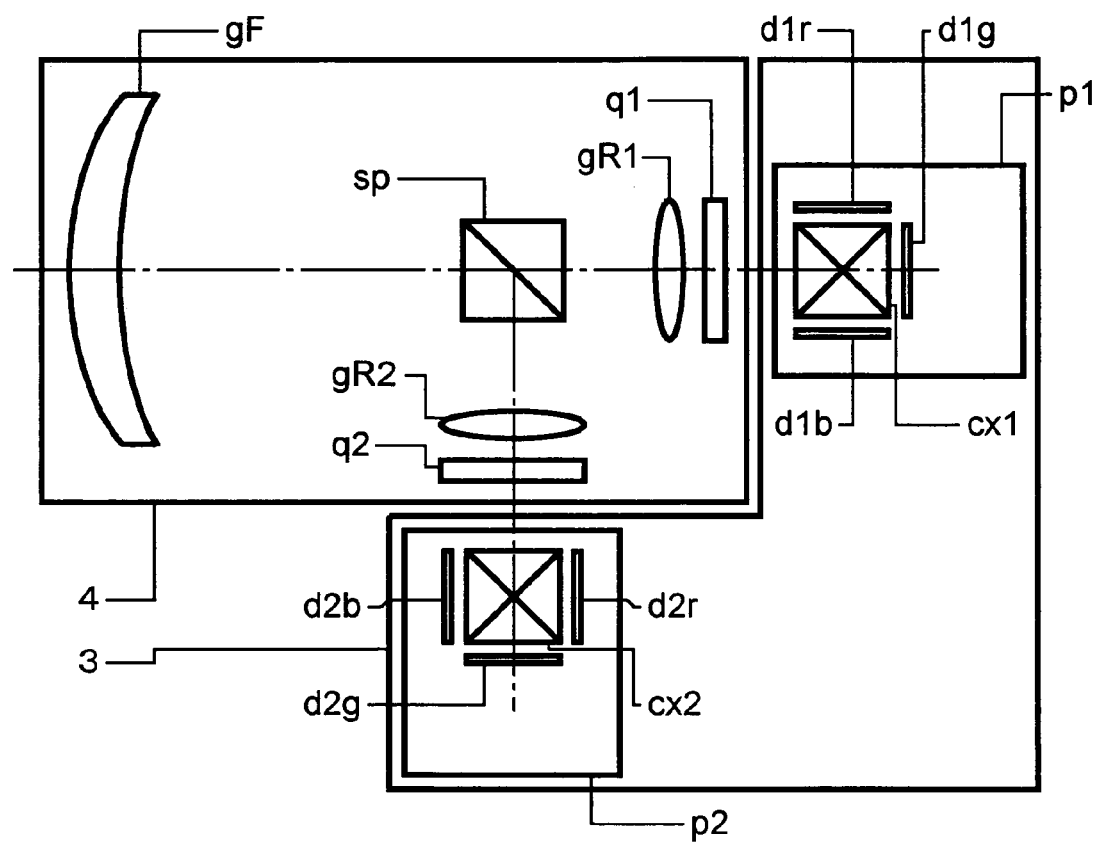
FIG. 12 is a diagram showing schematic optical construction of a third type digital planetarium apparatus.

The third type digital planetarium apparatus 10, as shown in FIG. 12, is configured to have two video projectors p1 and p2 in a projection part 3 and project, by a fish-eye lens part 4 arranged on the light emission side thereof, a picture on the dome screen 1 (FIG. 1). The two video projectors p1 and p2 corresponding to the original image generator have therein display devices d1$r$, d1$g$, d1$b$ and d2$r$, d2$g$, d2$b$, respectively, and cross dichroic prisms cx1 and cx2, respectively. In the video projectors p1 and p2 shown in FIG. 12, as the display devices d1$r$, d1$g$, d1$b$ and d2$r$, d2$g$, d2$b$, transmission type LCDs are assumed, but the video projectors p1 and p2 having display devices such as digital micromirror devices, reflection type LCDs, or the like, or having selfluminnance display devices such as EL elements or the like may be used.

In each of the display devices d1$r$, d1$g$, d1$b$ and d2$r$, d2$g$, d2$b$, semicircular images corresponding to image displays of R, G, and B, respectively, are generated in the same manner as in the first and second embodiments. The fish-eye lens part 4 has two polarization conversion elements q1 and q2, two rear lens groups gR1 and gR2, one polarization beam splitter sp, and one front lens group gF. One front lens group gF and the two rear lens groups gR1 and gR2 form a fish-eye lens. The fish-eye lens is not limited to an optical system formed of only lenses provided as transmission type optical elements, but may be an optical system including reflection type optical elements, such as a mirror or the like, an optical system including diffraction type optical elements, such as a diffractive lens or the like, or the like.

The third type digital planetarium apparatus 10 is of a type having no relay lens. Therefore, two semicircular images generated by the video projectors p1 and p2, without forming an intermediate image, are projected on the dome screen 1 on an enlarged scale by a fish-eye lens formed of a front lens group gF and rear lens groups gR1 and gR2. That is, one circular image of two semicircular images corresponding to image displays of R, G, and B, respectively, which are originally generated by three semicircular images corresponding to image displays of R, G, and B, respectively, generated by the display devices d1$r$, d1$g$, d1$b$ and three semicircular images corresponding to image displays of R, G, and B, respectively, generated by the display devices d2r, d2g, d2b, are formed on the dome screen 1. In this condition, the optical paths of the two semicircular images are synthesized between the front lens group gF and the rear lens groups gR1 and gR2 so that the two semicircular images are so focused as to be linked together as one circular image The optical path synthesis of the semicircular images described above is performed by the polarization beam splitter sp arranged between the front lens gF and the rear lens groups gR1 and gR2. The two video projectors p1 and p2 are so arranged as to be located at position offset from each other with respect to the polarization beam splitter sp so that the two semicircular images are so focused as to be linked together as one circular image. The polarization beam splitter sp has property that transmits P-polarized light and reflects S-polarized light with respect to the polarized light separation surface. Thus, the polarization conversion element q1 is arranged which unifies light from the video projector p1 into P polarized light so that P-polarized light enters from the rear lens group gR1. Moreover, the polarization conversion element q2 is arranged which unifies light from the video projector p2 into S-polarized light so that S-polarized light enters from the rear lens group gR2.

For example, in the video projectors p1 and p2 using LCDs as the display devices d1r, d1g, d1b and d2r, d2g, d2b, in application of configuration such that only P-polarized light of G is emitted and S-polarized light of R and B is emitted, S-polarized light of R and B from the video projector p1 may be converted into a P-polarized light through wavelength selection by the polarization conversion element q1 and P-polarized light of G from the video projector p2 may be converted into a S-polarized light through wavelength selection by the polarization conversion element q2. In a case where the video projectors p1 and p2 emitting only P-polarized light are used, only the polarization conversion element q2 functioning as a half-wave plate may be arranged so that only P-polarized light enters the rear lens group gR1 and only S-polarized light enters the rear lens group gR2. On the contrary, in a case where the video projectors p1 and p2 emitting only S-polarized light are used, only the polarization conversion element q1 functioning as a half-wave plate may be arranged so that only P-polarized light enters the rear lens group gR1 and only S-polarized light enters the rear lens group gR2.

In a case where digital micromirror devices are used as the display devices d1r, d1g, d1b and d2r, d2g, d2b, the same applies as when the LCDs described above are used. The polarization conversion element q1 may be arranged which unifies light from the video projector p1 into P-polarized light so that P-polarized light is emitted from the rear lens group gR1, and the polarization conversion element q2 may be arranged which unifies light from the video projector p2 into S-polarized light so that S-polarized light is emitted from the rear lens group gR2. As an image synthesizer which synthesizes optical paths of semicircular images between the front lens group and the rear lens groups so that the two semicircular images are so focused as to be linked together as one circular image, a different optical element having polarized light separation property may be used instead of the polarization beam splitter sp, and thus a half mirror may be used which divides the amount of light into reflected light and transmitted light in a predetermined ratio.

As described above, the third type digital planetarium apparatus 10 is characterized by having: the original image generator which is composed of the two video projectors p1 and p2 and generates the semicircular images in the display devices d1r, d1g, d1b and d2r, d2g, d2b in the video projectors p1 and p2, respectively; the fish-eye lens which is composed of the front lens group gF and the rear lens groups gR1 and gR2 arranged in order from the enlargement side and which projects the two semicircular images generated by the original image generator; and an image synthesizer which synthesizes the optical paths of the two semicircular images between the front lens group gF and the rear lens groups gR1 and gR2 so that the two semicircular images are so focused as to be linked together as one circular image. With this construction, the semicircular images are respectively generated by the two video projectors (p1, p2) with an aspect ratio of, for example, 16 to 9 in the original image generator, and the two semicircular images are projected by the fish-eye lens. Between the front lens gF and the rear lens groups gR1 and gR2 forming the fish-eye lens, the optical paths of the two semicircular images are synthesized by the image synthesizer, whereby the two semicircular images are so focused as to be linked together as one circular image. In this case, each of the semicircular images forming the circular image is converted into a picture suitable for the entire dome sky and then projected on the dome screen 1 (FIG. 1) by, for example, a fish-lens adopting projection formula, such as equidistance projection. Due to the construction using the two video projectors p1 and p2, higher resolution can be provided, and the semicircular images are generated in the display devices d1r, d1g, d1b and d2r, d2g, d2b, respectively, inside the video projectors p1 and p2, and thus the non-projected region decreases even when the video projectors p1 and p2 have an aspect ratio of 16 to 9. Moreover, with reference to the brightness of one of the video projectors, the brightness of the other video projector can be adjusted, thus permitting easy brightness adjustment.

In application of the optical construction of any of the first to third types, higher resolution can be achieved while a single lens method is adopted as a projection method, and also an image region generated by the video projectors increases thus permitting effective use of an image display surface (for example, an aspect ratio of 16 to 9). The number of fish-eye lenses is only one, thus contributing to cost reduction. With the optical constructions of the first or second type, the optical system up to the intermediate image (circular image IM) and the optical system forming the fish-eye lens thereafter can be individually provided, while with the optical construction of the third type, the front lens group and the rear lens groups can be individually provided, thus permitting flexible design change even if the types of video projectors are different from each other, which in turn permits further cost reduction. For video projector adjustment operation, only the two video projectors need to be adjusted. That is, contrary to a digital planetarium in a conventional split projection method in which a plurality of video projectors need to be adjusted with reference to one video projector, with reference to the brightness and picture of one of the video projectors, the other video projector needs to be adjusted, thus requiring no complicated adjustment operation.

As can be seen from the description provided above, the aforementioned embodiments include the following constructions.

A digital planetarium apparatus with the first construction includes: an original image generator which is formed of two video projectors and which generates semicircular images in display devices inside the respective video projectors; an intermediate image generator which optically focuses the two semicircular images generated by the original image generator to thereby generate a circular image; and a fish-eye lens which projects the circular image generated by the intermediate image generator.

According to the first construction, in the original image generator, the semicircular images are respectively generated in the two video projectors with an aspect ratio of, for example, 16 to 9, and then optically focused by the intermediate image generator to be synthesized as the circular image. The circular image is converted into a picture suitable for the dome whole sky and then projected onto the dome screen by, for example, a fish-eye lens adopting an equidistance projection formula. Other projection formulae, such as stereographic projection and equisolid angle projection, can be adopted as the projection formula employed by the fish-eye lens by way of picture conversion. The construction, which uses the two video projectors, permits achieving higher resolution, and since the semicircular images are respectively formed on the display devices, even if the video projectors to be used have an aspect ratio of 16 to 9, a non-projected region decreases. Moreover, with reference to the brightness of one of the video projectors, the brightness of the other video projector can be adjusted, thus permitting easy brightness adjustment.

The digital planetarium apparatus with the second construction, in the first construction described above, the intermediate image generator includes: a first relay lens which optically focuses the semicircular image generated in the display device inside one of the video projectors; and a second relay lens which optically focuses the semicircular image generated in the display device inside another of the video projectors, and optical axes of the relay lenses shift from centers of the respective display devices.

According to the second construction, focusing is performed on the first and second relay lenses by using portions biased to one side of the optical axes thereof. This improves the degree of freedom in designing and arrangement of the first and second relay lenses, thus permitting compactification of the digital planetarium apparatus.

The digital planetarium apparatus with the third construction, in the second construction described above, the optical axes of the first and second relay lenses and an optical axis of the fish-eye lens match with each other.

According to the third construction, design is possible such that distortion, chromatic aberration of magnification, and curvature of field are interpolated between the first and second relay lenses and the fish-eye lens, thereby contributing to achieving higher image quality.

The digital planetarium apparatus with the fourth construction, in the first construction described above, the intermediate image generator includes: a first relay lens which optically focuses the semicircular image generated in the display device inside one of the video projectors; and a second relay lens which optically focuses the semicircular image generated in the display device inside another of the video projectors, and optical axes of the relay lenses match with centers of the respective display devices.

According to the fourth construction, the simple construction such that the optical axes of the relay lenses match with the centers of the display devices permits lower-cost design.

The digital planetarium apparatus with the fifth construction, in the fourth construction, in order that the semicircular image formed by the first relay lens and the semicircular image formed by the second relay lens are synthesized into a planar shape, the intermediate image generator inclines the display devices inside the video projectors with respect to the optical axes of the respective relay lenses.

According to the fifth construction, the display devices are inclined with respect to the optical axes of the respective relay lenses, and thus the formation of the circular image into a planar shape permits an improvement in the image quality.

The digital planetarium apparatus with the sixth construction, in any one of the second to fifth constructions, the intermediate image generator has, at or near position where the semicircular images are focused by the first and second relay lenses, a field lens, a mirror, or a prism.

According to the sixth construction, the field lens, the mirror, or the prism permits matching ray angles of the first and second relay lenses with a ray angle of the fish-eye lens.

The digital planetarium apparatus with the seventh construction, in any one of the first to sixth constructions, the fish-eye lens is substantially telecentric to a circular image side.

According to the seventh construction, the property of the fish-eye lens, i.e., being substantially telecentric to the circular image side, permits the images to be linked together clearly, thus improving the brightness efficiency.

The digital planetarium apparatus with the eighth construction, in any one of the first to seventh constructions, the first and second relay lenses are substantially telecentric to an intermediate image side.

According to the eighth construction, the property of the first and second relay lenses, i.e., being substantially telecentric to the intermediate image side, permits the images to be linked together clearly, thus improving the brightness efficiency. Moreover, it is further preferable that the first and second relay lenses are substantially telecentric to the both sides.

A digital planetarium apparatus with the ninth construction has: an original image generator which is formed of two video projectors and which generates semicircular images in display devices inside the respective video projectors; a fish-eye lens which is formed of, in order from an enlargement side, a front lens group and a rear lens group and which projects the two semicircular images generated by the original image generator; and an image synthesizer which synthesizes optical paths of the two semicircular images between the front lens group and the rear lens group so that the two semicircular images are so focused as to be linked together as one circular image.

According to the ninth construction, in the original image generator, the semicircular images are respectively generated in the two video projectors with an aspect ratio of, for example, 16 to 9, and then projected by the fish-eye lens. Between the front lens group and the rear lens group forming the fish-eye lens, optical paths of the two semicircular images are synthesized by the image synthesizer whereby the two semicircular images are so focused as to be linked together as one circular image. In this case, each of the semicircular images forming the circular image is converted into a picture suitable for the dome whole sky and then projected onto the dome screen by, for example, a fish-eye lens adopting an equidistance projection formula. Other projection formulae, such as stereographic projection and equisolid angle projection, can be adopted as the projection formula employed in the fish-eye lens by way of picture conversion. The construction, which uses the two video projectors, permits achieving higher resolution, and since the semicircular images are respectively formed on the display devices, even if the video projectors to be used have an aspect ratio of 16 to 9, a non-projected region decreases. Moreover, with reference to the brightness of one of the video projectors, the brightness of the other video projector can be adjusted, thus permitting easy brightness adjustment.

The digital planetarium apparatus with the tenth construction, in the ninth construction, the image synthesizer is a polarization beam splitter, the rear lens group is formed of a first rear lens group located on one video projector side and a second rear lens group located on another video projector side, and there are further provided: a first polarization conversion element which unifies light from one of the video projectors into P-polarized light so that P-polarized light is emitted from the first rear lens group and a second polarization conversion element which unifies light from another of the video projectors into S-polarized light so that S-polarized light is emitted from the second rear lens group.

According to the tenth construction, the synthesis of the optical paths of the two semicircular images using polarized light separation property possessed by the polarization beam splitter permits the two semicircular images to be efficiently linked together as one circular image.

A dome picture apparatus with the eleventh construction includes: an original image generator which is formed of two video projectors and which generates semicircular images in display devices inside the respective video projectors; an intermediate image generator which optically focuses the two semicircular images generated by the original image generator to thereby generate a circular image; and a fish-eye lens which project, on a dome screen, the circular image generated by the intermediate image generator.

According to the eleventh construction, in the original image generator, the semicircular images are respectively generated in the two video projectors with an aspect ratio of, for example, 16 to 9, and then synthesized as a circular image by being optically focused by the intermediate image generator. The circular image is converted into a picture suitable for the dome whole sky and then projected onto the dome screen by, for example, a fish-eye lens adopting an equidistance projection formula. Other projection formulae, such as stereographic projection and equisolid angle projection, can be adopted as the projection formula employed in the fish-eye lens by way of picture conversion. The construction, which uses the two video projectors, permits achieving higher resolution, and since the semicircular images are respectively formed on the display devices, even if the video projectors to be used have an aspect ratio of 16 to 9, a non-projected region decreases. Moreover, with reference to the brightness of one of the video projectors, the brightness of the other video projector can be adjusted, thus permitting easy brightness adjustment.

A dome picture apparatus with the twelfth construction has: an original image generator which is formed of two video projectors and which generates semicircular images in display devices inside the respective video projectors; a fish-eye lens which is formed of, in order from an enlargement side, a front lens group and a rear lens group and which projects on a dome screen the two semicircular images generated by the original image generator; and an image synthesizer which synthesizes optical paths of the two semicircular images between the front lens group and the rear lens group so that the two semicircular images are so focused as to be linked together as one circular image.

According to the twelfth construction, in the original image generator, the semicircular images are respectively generated in the two video projectors with an aspect ratio of, for example, 16 to 9, and then projected by the fish-eye lens. Between the front lens group and the rear lens group forming the fish-eye lens, optical paths of the two semicircular images are synthesized by the image synthesizer whereby the two semicircular images are so focused as to be linked together as one circular image. In this case, each of the semicircular images forming the circular image is converted into a picture suitable for the dome whole sky and then projected onto the dome screen by, for example, a fish-eye lens adopting an equidistance projection formula. Other projection formulae, such as stereographic projection and equisolid angle projection, can be adopted as the projection formula employed in the fish-eye lens by way of picture conversion. The construction, which uses the two video projectors, permits achieving higher resolution, and since the semicircular images are respectively formed on the display devices, even if the video projectors to be used have an aspect ratio of 16 to 9, a non-projected region decreases. Moreover, with reference to the brightness of one of the video projectors, the brightness of the other video projector can be adjusted, thus permitting easy brightness adjustment.

According to the first or eleventh construction, due to the configuration that semicircular images are generated by two video projectors forming an original image generator, and optically focused by an intermediate image generator to thereby generate a circular image, which is projected by a fish-eye lens, a digital planetarium apparatus and a dome picture apparatus can be achieved which, even when a single lens method is adopted as a projection method, provides high resolution and can increase an image region generated by the video projectors to effectively use an image display surface (for example, an aspect ratio of 16 to 9). Moreover, according to the ninth or twelfth construction, due to the configuration that semicircular images are generated by two video projectors forming an original image generator and optical paths of the semicircular images are synthesized by an image synthesizer and projected by a fish-eye lens so that the two semicircular images are so focused as to be linked together as one circular image, a digital planetarium apparatus and a dome picture apparatus can be achieved which, even when adopting a single lens method as a projection method, provides high resolution and can increase an image region generated by the video projectors to effectively use an image display surface (for example, an aspect ratio of 16 to 9). According to any of the first to twelfth constructions, the number of fish-eye lenses is only one, thus permitting achieving cost reduction. Further, according to the first or eleventh construction, an optical system up to an intermediate image and an optical system forming the fish-eye lens thereafter can be individually provided, while, according to the ninth or twelfth construction, a front lens group and rear lens groups can be individually provided, thus permitting flexible design change even if the types of video projectors are different from each other, which in turn permits further cost reduction.

In a digital planetarium adopting a conventional split projection method, six video projectors are typically used; thus, five of the video projectors need to be adjusted with reference to remaining one of the video projectors. The adjustment operation is complicated and it is also difficult to determine one of them as a reference. On the contrary, according to the above-mentioned constructions, only two video projectors need to be adjusted. That is, with reference to the brightness or picture of one of the video projectors, only another of the video projectors needs to be adjusted. A digital planetarium apparatus adopting a single lens method using one video projector requires no adjustment among video projectors, but has difficulty in achieving higher resolution.

What is claimed is:

1. A digital planetarium apparatus comprising:
    an original image generator which is formed of two video projectors and which generates semicircular images in display devices inside the respective video projectors; an intermediate image generator which optically focuses the two semicircular images generated by the original image generator to thereby generate a circular image; and a fish-eye lens which projects the circular image generated by the intermediate image generator.

2. The digital planetarium apparatus according to claim 1, wherein the intermediate image generator includes: a first relay lens which optically focuses the semicircular image generated in the display device inside one of the video projectors; and a second relay lens which optically focuses the semicircular image generated in the display device inside another of the video projectors, and wherein optical axes of the relay lenses shift from centers of the respective display devices.

3. The digital planetarium apparatus according to claim 2, wherein the optical axes of the first and second relay lenses and an optical axis of the fish-eye lens match with each other.

4. The digital planetarium apparatus according to claim 1, wherein the intermediate image generator includes: a first relay lens which optically focuses the semicircular image generated in the display device inside one of the video projectors; and a second relay lens which optically focuses the semicircular image generated in the display device inside another of the video projectors, and wherein optical axes of the relay lenses match with centers of the respective display devices.

5. The digital planetarium apparatus according to claim 4, wherein, in order that the semicircular image formed by the first relay lens and the semicircular image formed by the second relay lens are synthesized into a planar shape, the intermediate image generator inclines the display devices inside the video projectors with respect to the optical axes of the respective relay lenses.

6. The digital planetarium apparatus according to claim 2, wherein the intermediate image generator has, at or near position where the semicircular images are focused by the first and second relay lenses, a field lens, a mirror, or a prism.

7. The digital planetarium apparatus according to claim 1, wherein the fish-eye lens is substantially telecentric to a circular image side.

8. The digital planetarium apparatus according to claim 2, wherein the first and second relay lenses are substantially telecentric to an intermediate image side.

9. A digital planetarium apparatus comprising:

an original image generator which is formed of two video projectors and which generates semicircular images in display devices inside the respective video projectors;

a fish-eye lens which is formed of, in order from an enlargement side, a front lens group and a rear lens group and which projects the two semicircular images generated by the original image generator; and an image synthesizer which synthesizes optical paths of the two semicircular images between the front lens group and the rear lens group so that the two semicircular images are so focused as to be linked together as one circular image.

10. The digital planetarium apparatus according to claim 9, wherein the image synthesizer is a polarization beam splitter, wherein the rear lens group is formed of a first rear lens group located on one video projector side and a second rear lens group located on another video projector side, and wherein there are further provided: a first polarization conversion element which unifies light from one of the video projectors into P-polarized light so that P-polarized light is emitted from the first rear lens group and a second polarization conversion element which unifies light from another of the video projectors into S-polarized light so that S-polarized light is emitted from the second rear lens group.

11. A dome picture apparatus comprising:

an original image generator which is formed of two video projectors and which generates semicircular images in display devices inside the respective video projectors; an intermediate image generator which optically focuses the two semicircular images generated by the original image generator to thereby generate a circular image; and a fish-eye lens which projects, on a dome screen, the circular image generated by the intermediate image generator.

12. A dome picture apparatus comprising:

an original image generator which is formed of two video projectors and which generates semicircular images in display devices inside the respective video projectors; a fish-eye lens which is formed of, in order from an enlargement side, a front lens group and a rear lens group and which projects on a dome screen the two semicircular images generated by the original image generator; and an image synthesizer which synthesizes optical paths of the two semicircular images between the front lens group and the rear lens group so that the two semicircular images are so focused as to be linked together as one circular image.

* * * * *